United States Patent [19]

Peck

[11] Patent Number: 4,835,606
[45] Date of Patent: May 30, 1989

[54] SWATHE SCANNED IMAGER

[75] Inventor: Roger Peck, Camberley, United Kingdom

[73] Assignee: Gec-Marconi Limited, Stanmore, United Kingdom

[21] Appl. No.: 175,801

[22] Filed: Mar. 31, 1988

[30] Foreign Application Priority Data

Apr. 10, 1987 [GB] United Kingdom ................. 8708671

[51] Int. Cl.$^4$ ............................................. H04N 7/18
[52] U.S. Cl. .................................... 358/113; 250/334; 358/213.16
[58] Field of Search ............................ 358/113, 213.16; 250/334

[56] References Cited

U.S. PATENT DOCUMENTS

| | | | |
|---|---|---|---|
| 4,225,883 | 9/1980 | Van Atta | 358/113 |
| 4,340,888 | 7/1982 | Seroskie | 358/113 |
| 4,403,148 | 9/1983 | Coon | 358/113 |
| 4,419,692 | 12/1983 | Modisette | 358/113 |
| 4,423,437 | 12/1983 | Beck | 358/213.16 |
| 4,712,010 | 12/1987 | Alm | 358/113 |

Primary Examiner—Howard W. Britton
Attorney, Agent, or Firm—Spencer & Frank

[57] ABSTRACT

Scanning imagers often comprise a plurality of detector elements which may be scanned in swathes to produce an image. To match the offsets or sensitivities of such elements the mean values of the channels adjacent each swathe boundary are compared, and an error signal produced which is fed back to equalize the values across each boundary. Proportionally smaller corrections are applied to the intermediate channels in each swathe. In this way the swathing or banding effect often associated with such imagers is much reduced.

5 Claims, 6 Drawing Sheets

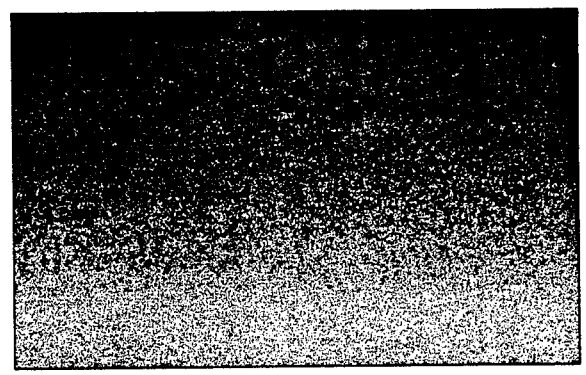
FIG./.
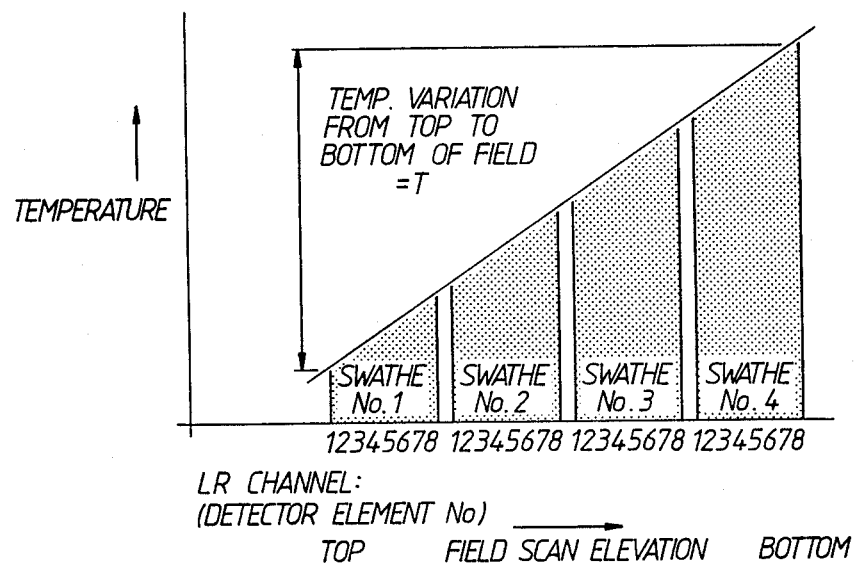
FIG.2.

SWATHE SCANNED IMAGER

FIELD OF THE INVENTION

This invention relates to apparatus for scanning a field of view in swathes, each swathe comprising a number of individual simultaneous scans by respective sensors of electro-magnetic energy. Thermal imagers are often constructed in this way.

In such thermal imagers the need arises to match the sensitivities and offsets of the sensor outputs because the sensors and the associated circuitry may have different characteristics. One way of meeting this requirement is to apply each sensor output to a circuit designed to adjust its average voltage level and its average ac amplitude to common values. Averaging is done over a period of at least several swathes and preferably of the order of a field. The averaging process may be restricted to a specific time interval when a particular part of the field of view is being scanned. The method relies on the assumption that the average temperatures viewed by each sensor over that period of time are equal.

The problem with this known system arises when the mean temperature of a scene changes in a direction perpendicular to the swathes (i.e. generally in the vertical direction). For such scenes the average temperature and/or contrast seen by the different sensors differs between each sensor. The method of adjustment described above does not take these differences into consideration and consequently a banded structure is seen on the image, reducing the quality of the image.

SUMMARY OF THE INVENTION

According to the present invention there is provided apparatus for scanning a field of view in swathes, each swathe comprising a simultaneous scan of a plurality of channels, the apparatus including means for averaging the output of each channel over a chosen time period of at least two swathes and adjusting the output of each channel so that the average outputs are equal, means for comparing the mean signal level of the final line of each swathe except the final swathe of an image with the mean signal level of the first line of each swathe except the first swathe of the image and for generating an error signal dependent upon the difference there between, means for using the error signal to equalise the mean values of the signals on each side of each swathe boundary, and; means for applying proportionally smaller corrections to modify the intermediate lines in each swathe.

In apparatus according to the invention therefore an additional feedback loop is added to the known channel matching circuits which serves to compare the mean signal level of the two channels adjacent every swathe boundary and to modify the output of one or each channel substantially to equalise them over the boundary. The outputs of all the intermediate channels in a swathe are then modified accordingly by interpolation or similar.

In a preferred embodiment, a series resistance chance can be used.

By the use of apparatus according to the invention the image is greatly improved and the banding or swathing effect seen with the prior art systems is greatly reduced.

In some cases it is desirable to include means for windowing the output of each channel such that only a temperature window of a desired width is output, in which case the means for measuring the outputs of the first and final lines of each swathe are adapted to measure these after windowing and to apply corrections to equalise the mean values at a point in each channel signal path prior to the windowing means.

BRIEF DESCRIPTION OF THE DRAWINGS

FIG. 1 shows a scene having a uniform vertical temperature gradient.

FIG. 2 shows the temperatures seen by the detectors of each channel during a scan of the scene.

DETAILED DESCRIPTION OF AN EMBODIMENT OF THE INVENTION

Figure 3:
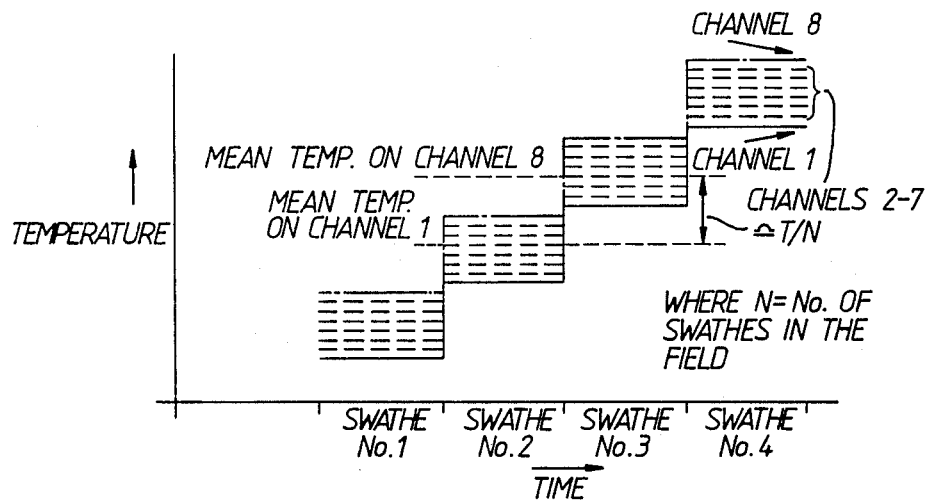
FIG. 3 shows temperature against time relationships for each of the detector elements in an imager.

In FIG. 1 there is shown an idealised scene which may be viewed by a thermal imager, having a uniform temperature gradient in the vertical direction, cold at the top and hot at the bottom. A thermal imager will often be constructed to view such a scene in swathes by the scanning of typically 8 detector elements. Generally up to 32 swathes will make up an image but in the following description only 4 swathes are described for reasons of clarity only. When such an imager views the scene of FIG. 1 the outputs of each detector element or channel will be as shown in FIG. 2. In the first swathe each detector element with view a part of the scene slightly brighter than that of the preceding detector element and hence the output will increase through the detectors, and so on through swathes two to four in this particular example. During any one swathe each detector element retains the same output as is shown more clearly in FIG. 3. The output increases between swathes. Note that blanking periods are not shown in FIG. 3.

In conventional offset and sensitivity matching methods the outputs of each channel are measured over a period of at least several swathes and preferably over a whole field and then averaged. This however assumes that the mean temperature seen by each channel is the same, but a brief inspection of FIG. 3 will show that for the scene given in FIG. 1 the mean temperature observed by channel 1 will be different to that observed by channel 8. The conventional method disregards these differences and increases or decreases the offset and sensitivity of each channel separately so that their average outputs are equal. This matching is achieved by techniques well known to those skilled in the art.

Typically, gain matching is achieved by comparing the mean level of the output signal of each channel with a common offset control voltage, at an error amplifier configured as an integrator with a time constant of several field periods. Any difference causes the integrator output voltage to slew at a rate proportional to the error and the resulting voltage is used to correct the level of the signal on each channel. To measure sensitivity, an integrator is preceded by an a.c. detector and is then used to alter the amplitude of the signal on each channel. Generally, one channel is used as a master channel and the remaining channels are slaves, with sensitivity controlled by the master channel.

Figure 4:
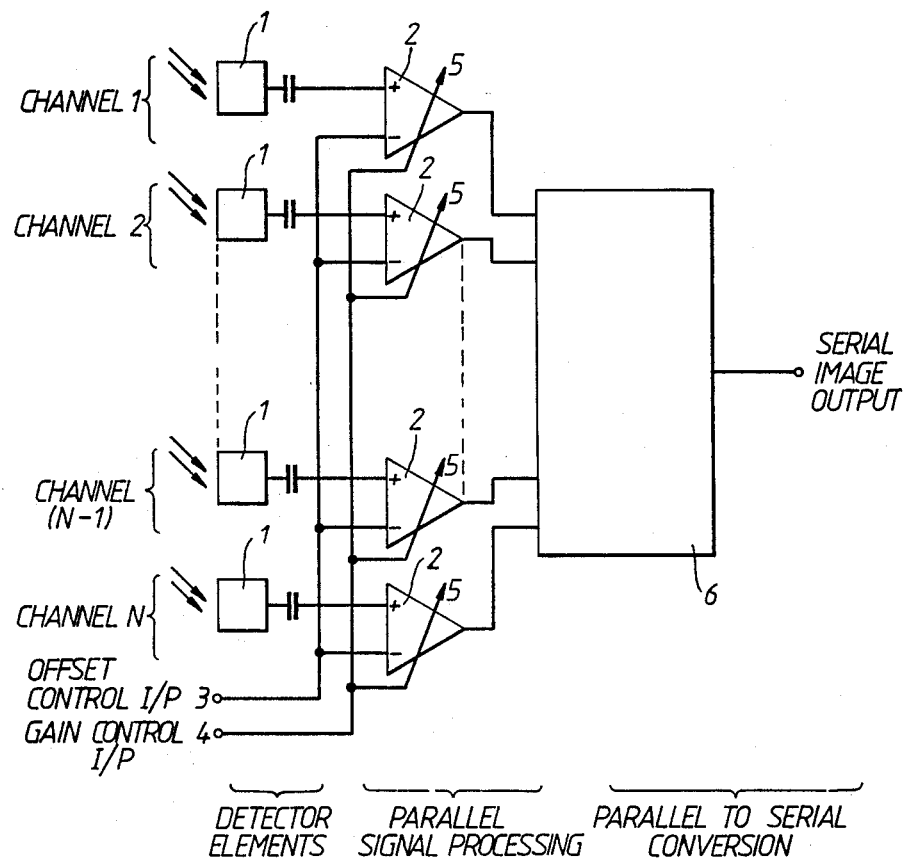
FIG. 4 is a block diagram of the basic elements of thermal imager processing electronics.

After matching has been achieved, an offset and gain are applied to the outputs of the 8 detectors in an apparatus similar to that in FIG. 4.

The apparatus of FIG. 4 comprises a plurality N, usually 8, of thermal imaging elements 1 which are a.c coupled to a respective input of N amplifiers 2. An offset control signal 3 is applied to the other input of each of the amplifiers and gain control signal 4 is used to alter the gain 5 of each amplifier. During a swathe, the outputs of each channel are processed in parallel and subsequently converted to serial form in the unit 6 from which a serial video output is obtained.

Figure 5:
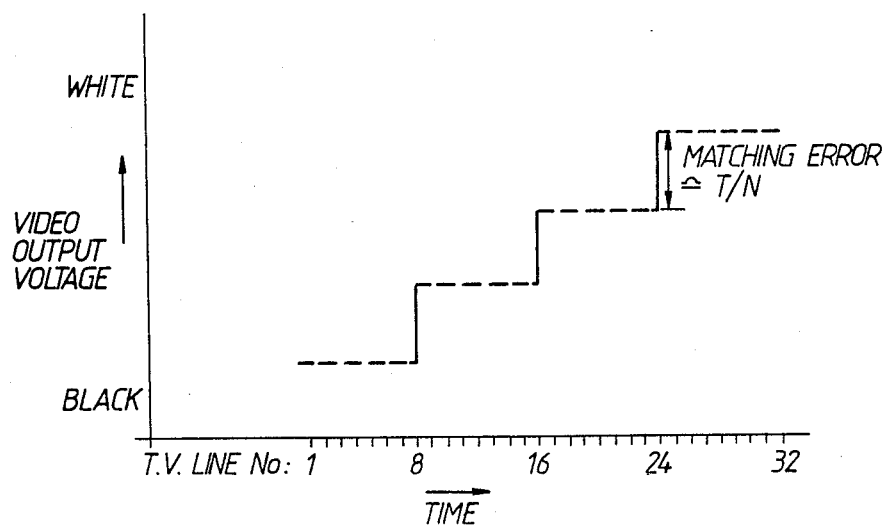
FIG. 5 shows the video output wave forms after matching the mean levels of the IR signals and parallel to serial conversion.
Figure 6:
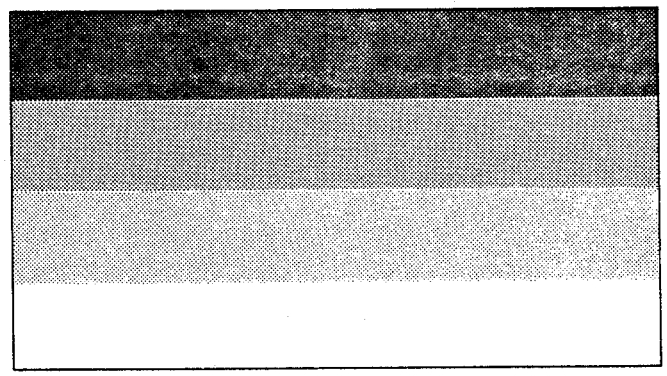
FIG. 6 shows the video display of the output wave form of FIG. 4.

FIG. 5 shows the video output wave form obtained after matching the mean levels of the 8 IR signals and after parallel to serial conversion. The TV Sync and blanking signals are omitted from the figure. It is seen that for the scene of FIG. 1, the video output has a step structure wherein it is constant over each line of a swathe and then jumps sharply to the first line of the next swathe. This sharp jump is due entirely to the matching error which has been introduced to the system by the assumption that each detector element views the same average temperature over the scene. Although the example given of a uniform temperature gradient has been chosen to accentuate the effect, the problem remains considerable since in most applications the average temperatures viewed by each element are not equal. This tends to produce outputs similar to that of FIG. 6 where a banding structure is clearly seen, degrading the image.

Figure 8:
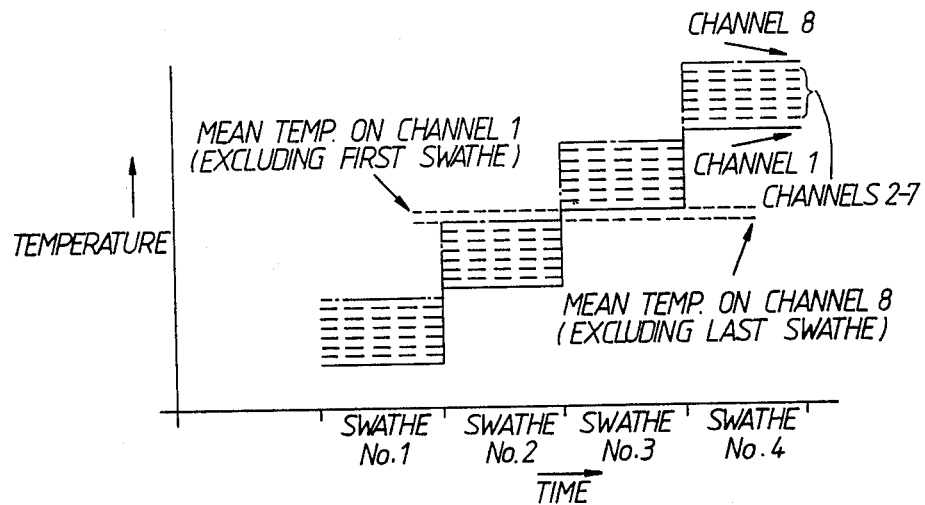
FIG. 8 shows similar waveforms to FIG. 3, but with the mean levels measured over different intervals.

A more acurate assumption than that of the mean scene matching scheme outlined above is that any two adjacent detector elements scan the same mean temperature, rather than assuming that all detector elements scan the same mean temperature. An illustration of how this improves matters is shown in FIG. 8 where the mean temperature observed by channel 1, with the exception of the temperature observed on the first swathe is seen to be very close to the mean temperature observed by channel 8 with the exception of the last swathe. In effect the mean temperature at each swathe boundary is being measured. Although there is a slight residual error it is far smaller than that of FIG. 3.

Figure 7:
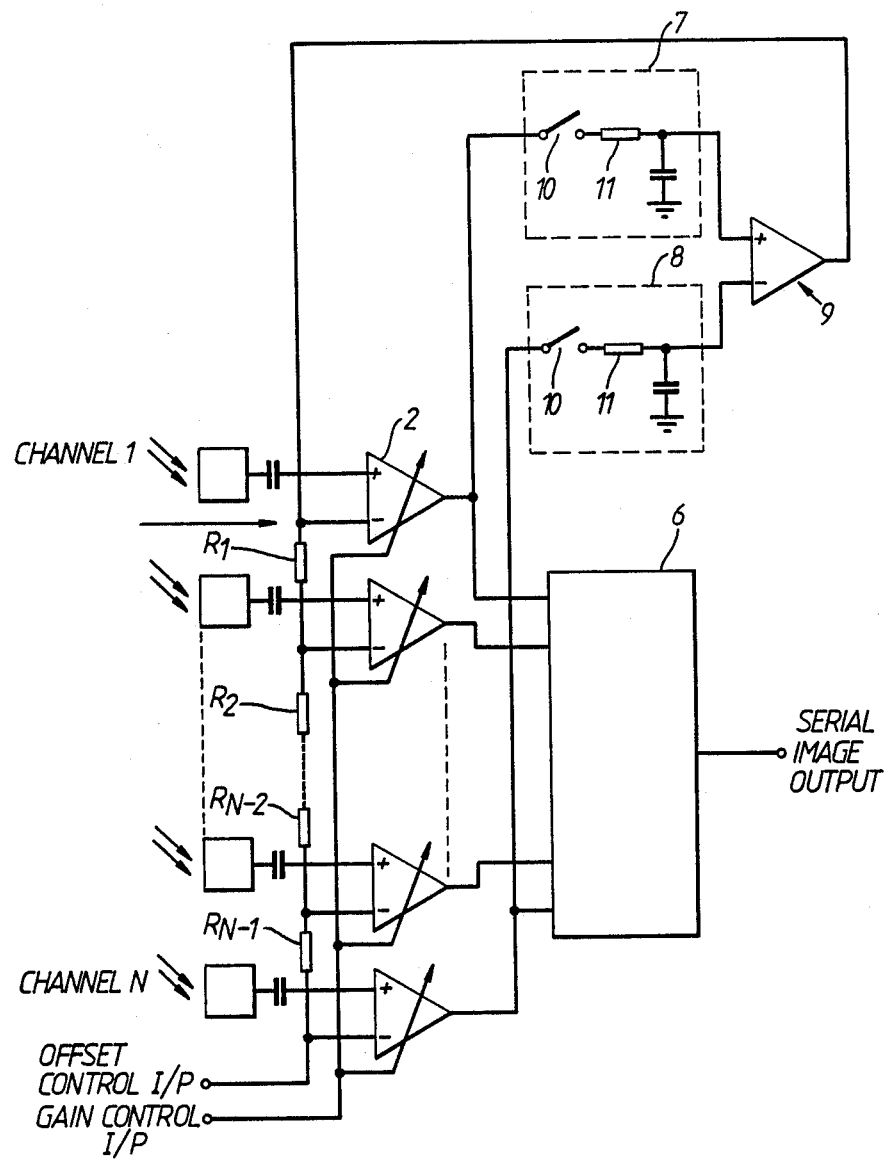
FIG. 7 is a block diagram of the electronics of FIG. 6 with the addition of a matching circuit according to the present invention.

FIG. 7 shows the addition, to the apparatus of FIG. 4, of a feedback loop incorporating this effect. In use, mean scene matching as described above is first applied to give an approximation to equalise the offsets and gains of all detector elements. The offset and gain values obtained are applied to each of channels 1 to 8 in conventional ways. The outputs of channel one and channel eight only are each applied to separate elements 7 and 8 in a feedback loop which further includes an error amplifier 9 and resistor chain $R_1 \ldots R_{n-1}$. The output of channel one is applied to unit 7 and that of channel eight to unit 8. Each of units 7 and 8 comprises a switch 10 and a resistor 11, the output of which is a.c. coupled to earth and is used as a respective input to amplifier 9. In use, during each swathe the outputs of channels one and eight are fed through units 7 and 8 respectively. Switches 10 are provided so that channel 1 is not measured during the first swathe and channel 8 is not measured during the final swathe. The outputs of units 7 and 8 are an indication of the mean level of each of channels one and eight and are compared in amplifier 9 which generates an output signal dependent upon the difference between them. This output signal is applied directly to the operational amplifier 2 associated with channel one to modify the offset of channel one so that the output of this channel during a swathe is almost identical to the output of channel eight during the previous swathe. The error signal from amplifier 9 is also applied through the resistor chain such that each of channels two to seven receives a proportionally smaller amount of the offset modifying voltage in each stage. Channel eight receives no further offset correction since the offsets of the other channels have been modified in accordance with the offset already allowed for on this channel.

Any other suitable correction method may be used to interpolate between the maximum and minimum correction applied to channels one and eight so that a suitable correction is applied to each of channels two to seven.

Figure 9:
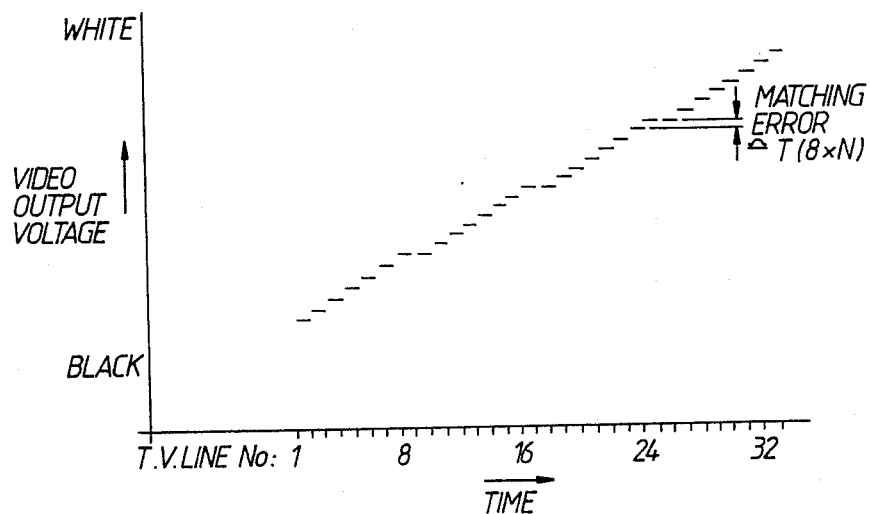
FIG. 9 shows video output wave forms achieved by using the technique of the present invention.

The output from the parallel to serial converter of the modified apparatus is shown in FIG. 9 which is immediately seen to be a much more accurate representation of the actual scene that was FIG. 5, there being a gradual change in intensity over the scene and a much reduced banding effect.

It should be noted that the above description relates to the matching of the offsets of the detectors of an imager. However, similar methods within the scope of the invention may be used to match their sensitivities in an analogous manner.

It is not always required to display the full dynamic range scanned by the detectors. Sometimes an imager may be set to display a narrow temperature window, with parts of the image saturated. In such cases, the apparatus of the invention may be adapted so that the signals on channels one and eight are measured after they have been clipped to define the temperature window, but in which the matching corrections are fed back to a point prior to windowing.

Figure 10:
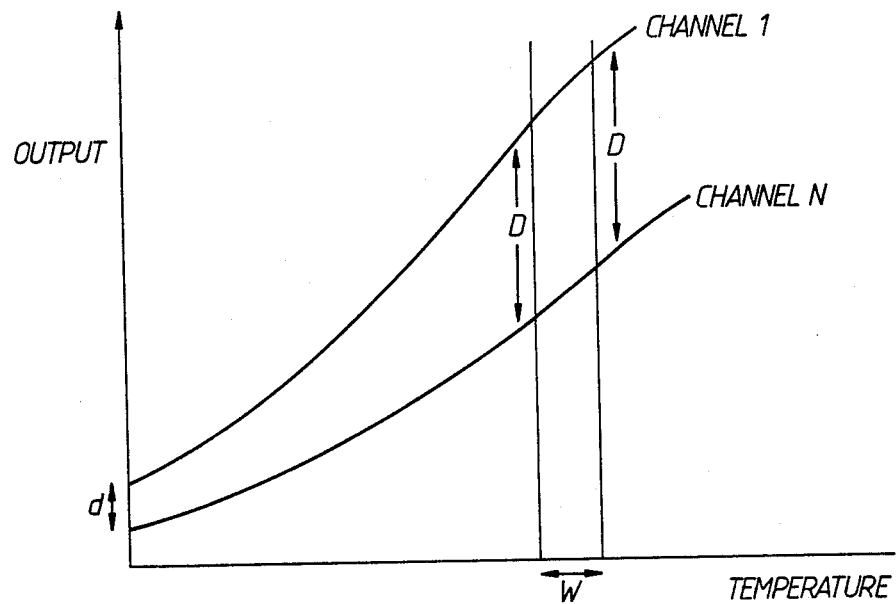
FIG. 10 shows schematically outputs from two channels having offset and sensitivity variations.

FIG. 10 shows schematically the outputs of two typical detectors with an offset difference d. It is seen from the figure that if the window w is narrow enough then the difference D between the two outputs over the window will be substantially constant and will be due to both offset and sensitivity variations, since if there were no differences in sensitivity then D would be equal to d. Hence, by matching the offset over the windowed region, sensitivity differences are also substantially reduced, i.e. By measuring the channels after windowing corrects not only offset errors but also improves the apparent offset errors caused by sensitivity mismatches. This may render it unnecessary to implement a separate sensitivity matching circuit. Such an arrangement also permits error measurement to be performed on the final serial output signal. This helps reduce any contributions to the swathe banding caused by any of the intermediate circuitry.

I claim

1. Apparatus for scanning a field of view in swathes, each swathe comprising a simultaneous scan of a plurality of channels, the apparatus including means for averaging the output of each channel over a chosen time period of at least two swathes and adjusting the output of each channel so that the average outputs are equal, means for comparing the mean signal level of the final line of each swathe except the final swathe of an image with the mean signal level of the first line of each swathe except the first swathe of the image and for generating an error signal dependent upon the difference therebetween, means for using the error signal to equalise the mean values of the signals on each side of each swathe boundary, and means for applying proportionally smaller corrections to modify the intermediate lines in each swathe.

2. Apparatus as claimed in claim 1 wherein the chosen time period is the time taken to scan one frame of an image.

3. Apparatus as claimed in claim 1 including means for windowing the output of each channel such that only a temperature window of a desired width is output, and wherein the means for measuring the outputs of the first and final lines of each swathe are adapted to measure these after windowing and to apply corrections to equalise the mean value at a point in each channel signal path prior to the windowing means.

4. Apparatus as claimed in claim 1 wherein the signals on the first and last channels on each swathe are switchably connected to respective inputs of an amplifier for generation of the error signal.

5. Apparatus as claimed in claim 1 wherein the means for applying correction to the intermediate lines of each swathe comprises a series resistance chain.

* * * * *